United States Patent [19]
Patterson et al.

[11] Patent Number: 5,443,224
[45] Date of Patent: Aug. 22, 1995

[54] EMERGENCY LOCKING PASSENGER SAFETY BELT MECHANISMS

[75] Inventors: Michael Patterson, Wreay; David Blackadder; John F. Bell, both of Carlisle, all of England

[73] Assignee: AlliedSignal Inc., Morristown, N.J.

[21] Appl. No.: 92,291

[22] Filed: Jul. 16, 1993

[30] Foreign Application Priority Data

Jul. 25, 1992 [GB] United Kingdom ............... 9215855

[51] Int. Cl.6 ............................................. B60R 22/40
[52] U.S. Cl. ............................... 242/384.2; 242/384.6
[58] Field of Search ........ 242/107, 107.4 R, 107.4 A, 242/107.4 B, 384.2, 384.6; 280/801 A, 806, 807

[56] References Cited

U.S. PATENT DOCUMENTS

| | | | |
|---|---|---|---|
| 4,040,576 | 8/1977 | Walker et al. | 242/107.4 A |
| 4,176,809 | 12/1979 | Thomas et al. | 242/107.4 A |
| 4,319,721 | 3/1982 | Kawai et al. | 242/107.4 A |
| 4,619,417 | 10/1986 | Teraoka et al. | 242/107.4 A |
| 4,796,918 | 1/1989 | Meyer et al. | 242/107.4 A X |
| 4,844,374 | 7/1989 | Mori | 242/107.4 A |
| 4,867,390 | 9/1989 | Joly | 242/107.4 A |
| 4,934,626 | 6/1990 | Kimura | 242/107.4 A |
| 4,998,684 | 3/1991 | Mori | 242/107.4 A |
| 5,251,843 | 10/1993 | Kielwein et al. | 242/107.4 A |

FOREIGN PATENT DOCUMENTS

| | | |
|---|---|---|
| 0092407 | 10/1983 | European Pat. Off. . |
| 9001078.7 | 5/1990 | Germany . |
| 2126876 | 4/1984 | United Kingdom . |

*Primary Examiner*—John P. Darling
*Attorney, Agent, or Firm*—Markell Seitzman

[57] ABSTRACT

An emergency locking vehicle seat belt retractor has a locking arrangement operation of which is initiated by an inertial vehicle deceleration sensing mechanism constructed with one or more parts being a composite of at least two acoustically differing materials to minimize vibrating noise.

6 Claims, 5 Drawing Sheets

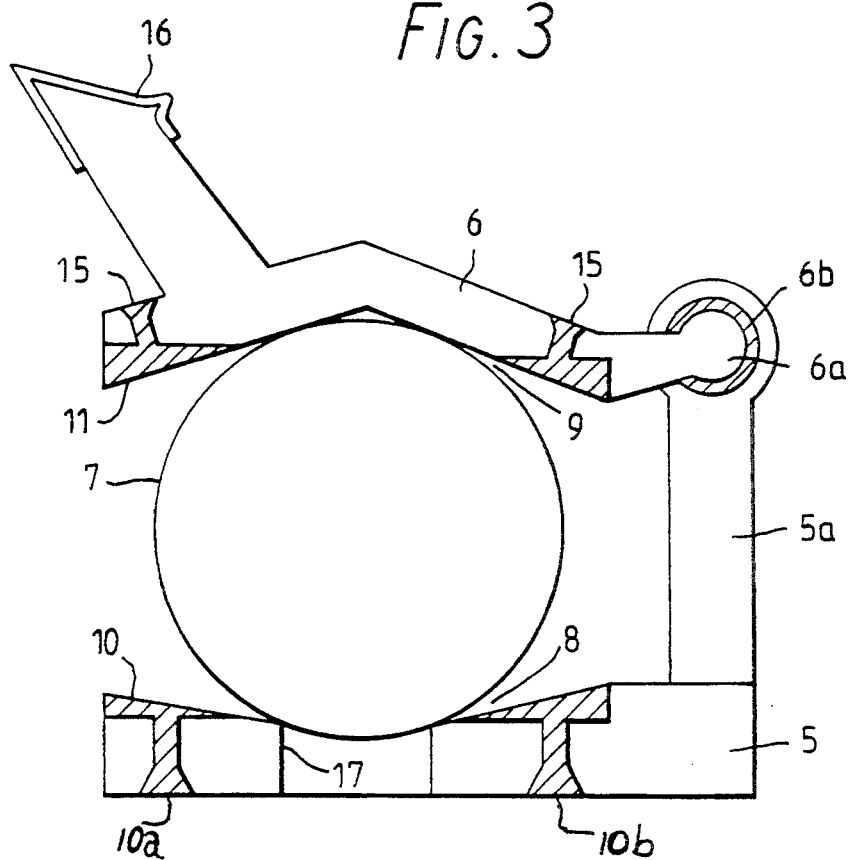
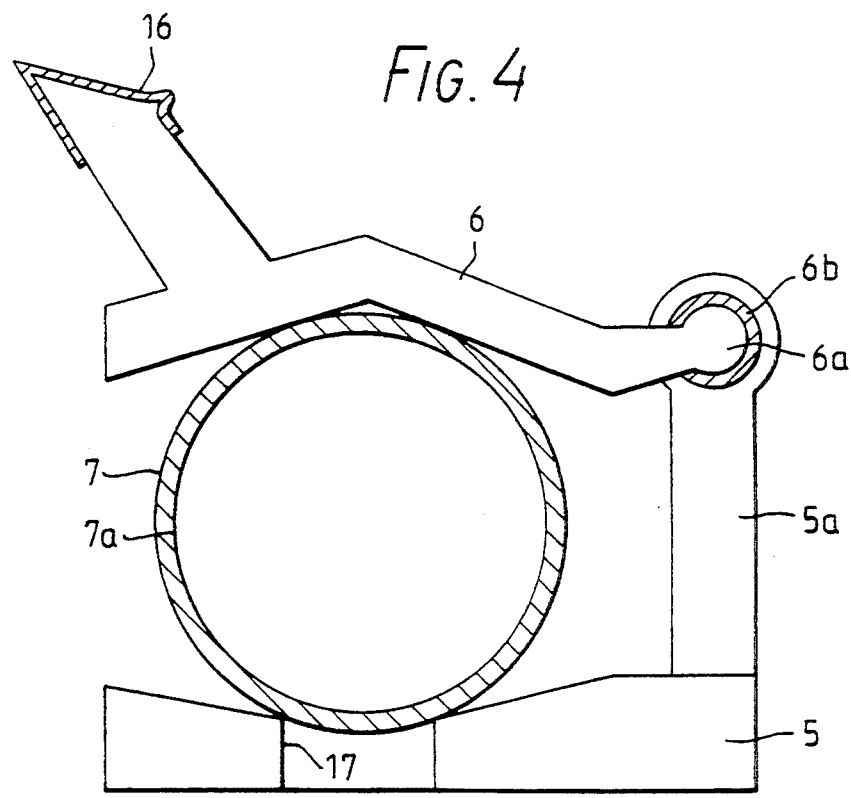

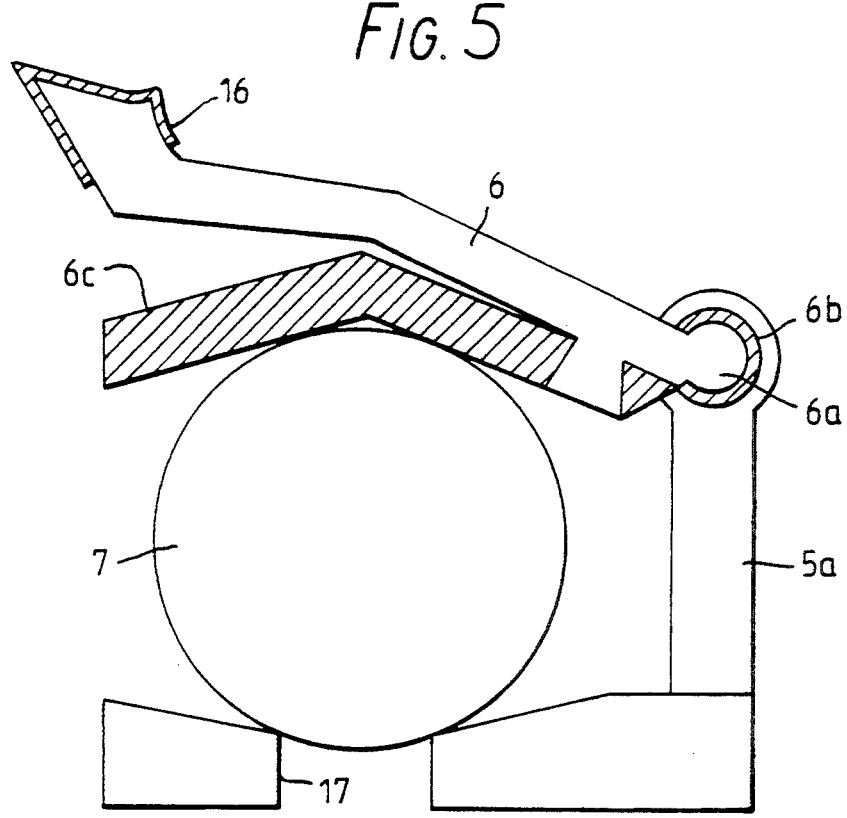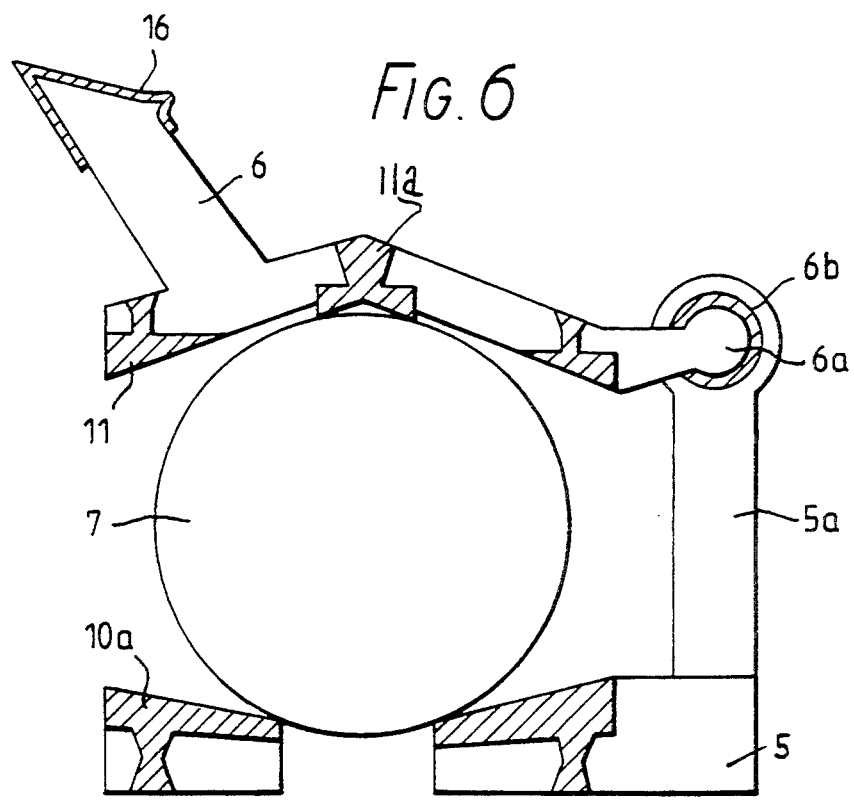

EMERGENCY LOCKING PASSENGER SAFETY BELT MECHANISMS

This invention relates to emergency locking passenger safety belt mechanisms and relates especially but not exclusively to a seat belt retractor which is provided with an inertial sensing mechanism is actuable to initiate belt locking in the event of a given rate of change of vehicle speed.

A typical safety seat belt retractor comprises a frame having means for secure mounting of the retractor to a vehicle body, for example within a 'B' pillar of a passenger car. The frame carries a reel rotatable on low friction bearings within the frame and incorporating a retraction spring which acts in a sense to coil the seat belt on the reel. In normal circumstances the reel is freely rotatable on its bearings but in the event of more than a predetermined vehicle deceleration being sensed by an inertial sensing mechanism, locking of the spool within the frame is initiated. The inertial sensing mechanism typically includes a ring of ratchet teeth to rotate with and on the axis of the spool and a light-weight pawl movable into engagement with the ratchet teeth by displacement of a small inertial body relative to the housing. Following such engagement rotation of the reel is interrupted and resultant tension in the belt is effective to cause locking of the reel and thereby the seat belt webbing in the frame.

One known mechanism which makes use of a locking member movable into engagement with locking teeth of the spool is described in European Patent Specification No. 0092407. Another mechanism which effects locking by lifting the axis of the reel for direct locking engagement between the spool and the frame is described in European Patent Specification No. 0228171.

Another form of emergency locking mechanism which employs inertially actuated locking of the seat belt webbing is a mechanism which comprises a webbing clamping arrangement such as described for example in U.K. Patent Specification No. 2126876.

One shortcoming of such retractor mechanisms when used in modern quiet-running passenger cars is that since the mentioned pawl and inertial sensing mechanism is of such light construction that it can rattle and there is a tendency for it to produce a low but nevertheless audible noise level. However, having regard for the provision of four or more such retractors within one body shell it is very desirable to remove or suppress such noise, to meet modern car manufacturers requirements, without adding any components which may interfere with or reduce the sensitivity of operation of the sensing mechanism.

According to the present invention there is provided a vehicle passenger seat belt emergency locking mechanism comprising a frame normally permitting free movement of belt material and an inertial sensing mechanism comprising one or more light moulded parts co-operable with locking means to cause the belt material to be locked against withdrawal from the frame by the effect of belt tension, characterised in that at least one of said light moulded parts comprises at least two acoustically different materials.

In order that the present invention may be more clearly understood and readily carried into effect the invention will be further described by way of an example with reference to the accompanying drawings of which:

FIG. 3 is an enlarged scale part sectional view of a vehicle deceleration sensitive mechanism used in the retractor of FIGS. 1 and 2.

FIGS. 4–7 illustrate alternative examples of vehicle deceleration sensitive mechanisms which may be used in a retractor such as that of FIGS. 1 and 2.

Figure 1:
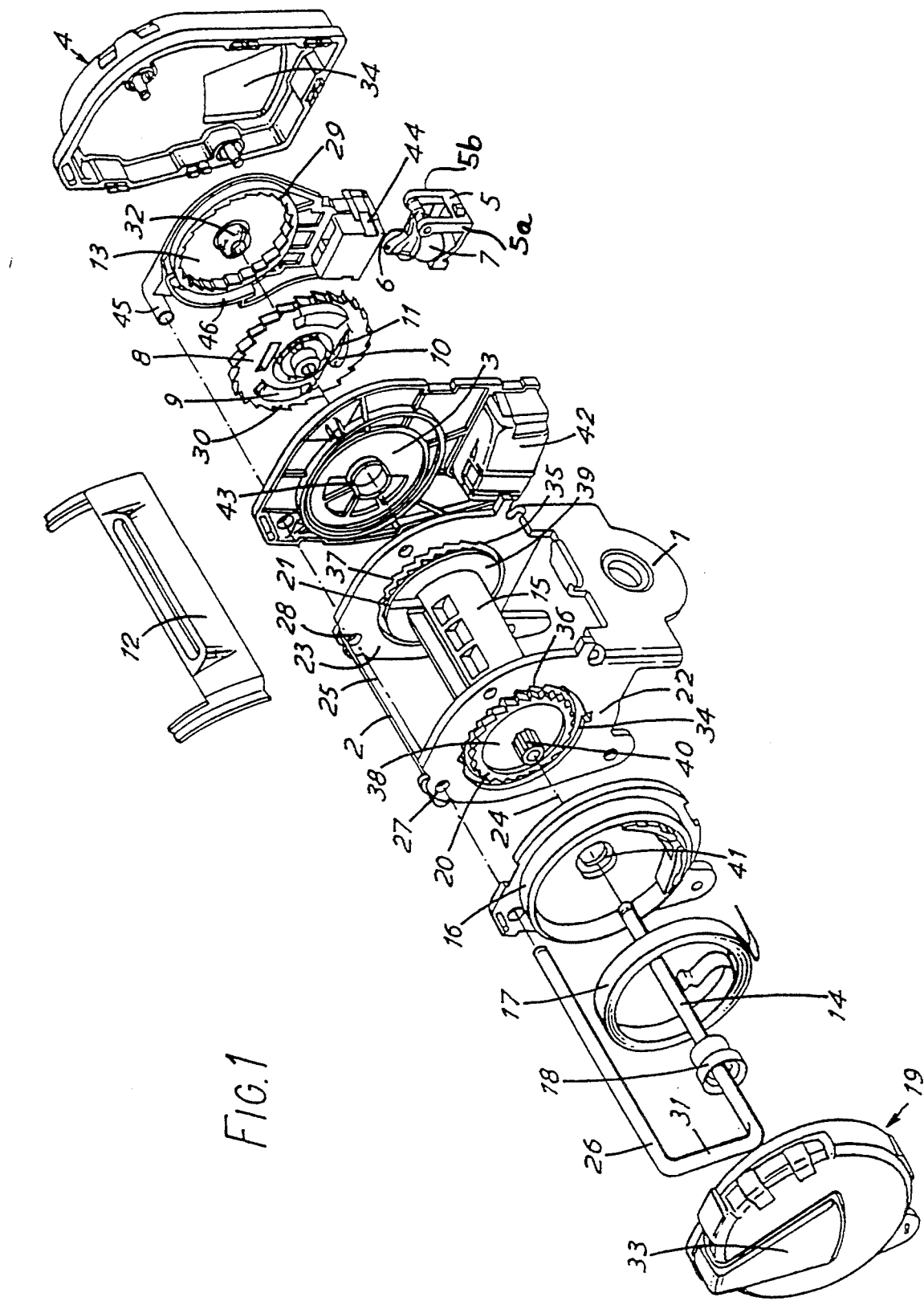
FIG. 1 is a perspective exploded view of the various components, from which one embodiment of a safety belt retractor is assembled.
Figure 2:
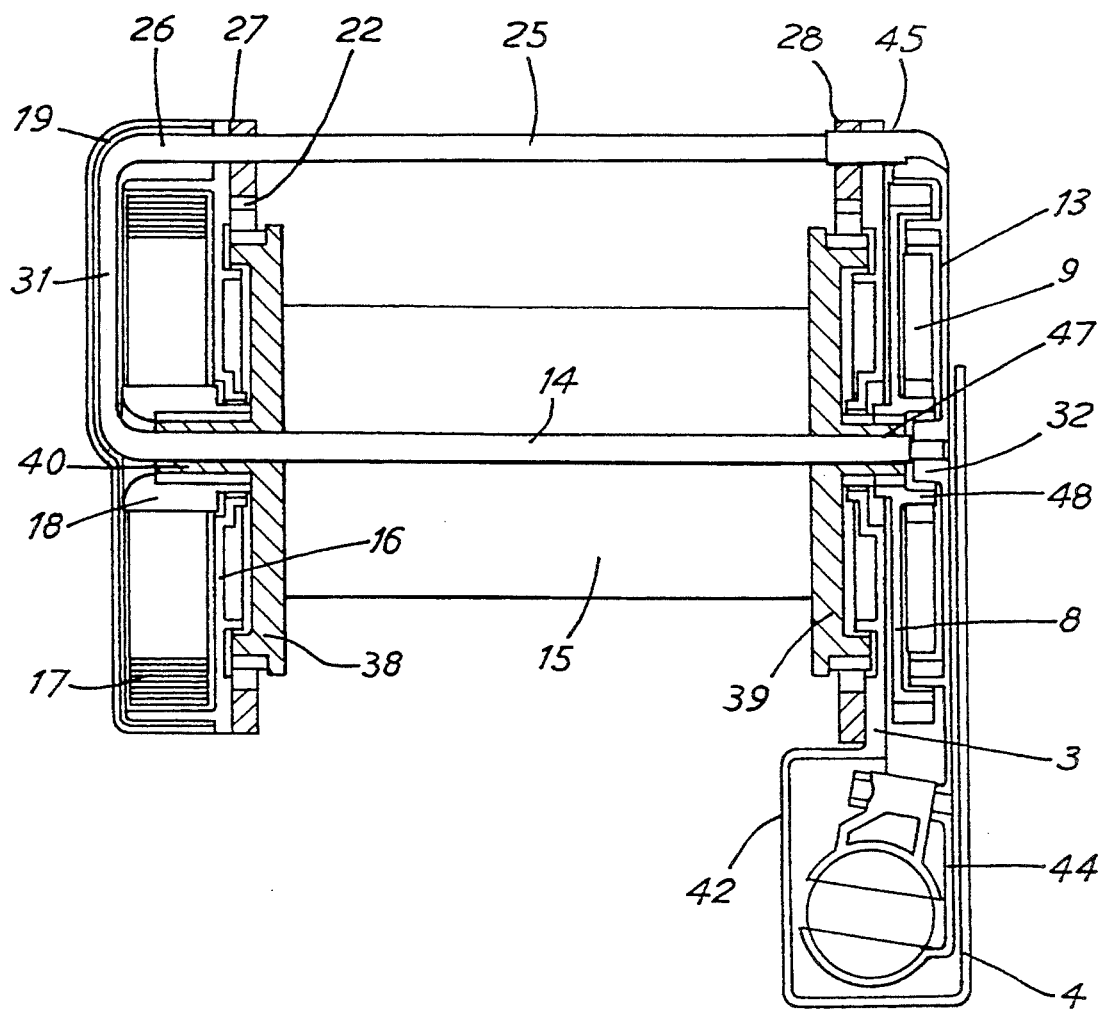
FIG. 2 shows a part section of the fully assembled safety belt retractor the individual parts of which are shown in FIG. 1

The automatic rewinding type safety belt retractor shown in FIGS. 1 and 2 comprises a frame or bracket 1 to be anchored or fixed to a vehicle. This frame 1 has two side frame pieces 22 and 23 extending parallel to one another. Both side frames 22 and 23 have substantially circular apertures 34, 25 on parts of the circumferences of which are teeth 36 and 37. In frame 1 is the winding reel 15 around which can be wound a webbing of a safety belt, not shown. The winding reel 15 has circular disks 38, 39 at its two ends. In the case of the embodiment shown these discs 38, 39 have teeth 20, 21 extending around their entire circumferences. These teeth 20, 21 are complimentary to teeth 36 and 37 on the internal circumference of the apertures 34 and 35 in the two frame sides 22, 23. The two-circular end discs 38, 39 rest with their teeth 20, 21 in the apertures 34, 35 in the frame sides 22, 23.

The frame 1 is stiffened by a distance piece 2. A conventional design belt guide 12 is provided for facilitating the guiding of the safety belt webbing (not shown).

On the spring side (to the left of frame 1 shown in FIG. 1) is a pretensioned retraction spring 17 which engages in a spigot pinion 40 at one end of the reel 15. The spring 17 is designed in the form of a coil clock spring and its outer end is retained by a spring cup 18. The retraction means for the safety belt containing the retraction spring 17 is enclosed in a spring cup 16 by a cup shape cover 19 which acts also as park of the retractor housing on the side where the spring is located. The spring cup 16 and the housing part 19 are made from plastic mouldings. In the as-fitted state the spring cup 16 is placed directly on the side face of the frame side 22, with the pinion 40 projecting through a hole 41 in the bottom of the spring cup 16 and the inner end of the coil spring 17 engages the pinion or spline 40 by means of a spring core 18.

On the right hand side of FIGS. 1 and 2, a mechanism base plate 3 is placed directly on the outer face of the frame side 23. At its lower end the mechanism base plate 3 has a housing part 42 which accommodates the deceleration sensor system, 5, 6, 7. A pinion or spline (not shown) projects from the end disc 39 into a hole 43 in the base plate for the mechanism. On this (not shown) pinion engages a ratchet wheel 8, also thus rotationally connected to the winding reel 15. The ratchet wheel 8 has a hollow cylindrical axle stub on which is rotatably supported a rotary inertia plate 9. On the rotary inertia plate 9 is a leaf spring 11 which biases in known manner a ratchet pawl 10 mounted on the ratchet wheel 8 out of engagement with internal ratchet teeth 29 or a multifunction part 13.

The multifunction part 13 has at its lower end means for accommodating the vehicle deceleration sensitive sensor mechanism 5, 6, 7, As seen on enlarged scale in FIG. 3, the mechanism comprises a plastic moulded frame 5 with two upstanding pillars 5a and 5b (shown in FIG. 1) having horizontal apertures which receive pivot pins at 6a and 6b of a shaped plastic moulded pawl 6 which lightly rests on a steel sphere 7 sitting in an indentation 17 at the lower part of frame 5. The frame is assembled into a lower housing 44 (FIG. 1) integral with the multifunction part 13. Normally the tip of pawl 6 rests clear of the teeth of the ratchet wheel 8. Slight lifting of the pawl 6 will render it engageable with teeth 30 of the ratchet wheel 8. The multifunction part 13 is substantially cup-shaped and has a central fixing location 32 for one end of a U-shaped bearing needle part 14. The end of the bearing needle 14 on the mechanism side is held in this bearing location 32. The bearing needle 14 supports the spool 15 for low friction rotation and passes through all the parts to the fixing location 32 on the multifunction part 13.

The end of the bearing needle where the spring is located is in a U-shape with the bridge of the U-shaped needle part forming a rocking lever 31 whilst the outer limb 26 pivots in the frame pieces 22, 23 and is fixingly received by a spigot 45 on the multifunction part 13 and defines a rocking axis 25 for the bearing needle and the spool.

The free limb at the end of the bearing needle on the spring-side is inserted so as to be free to rotate in a hold forming a bearing location 27 in the frame piece 22. The bearing peg 45 on the multifunction part 3 is located likewise through a hole 28 in the mechanism frame piece 23. The apertures of the bearing locations 27 and 28 are in line with one another and the thereby formed rocking axis 25 extends parallel to the axis of the bearing needle 14 which passes through the winding reel 15. An off-centre or asymmetrical support of the winding reel is thus obtained. The bearing locations 27 and 28 in which are inserted the free limb 26 and the bearing peg 45 are bearing locations and their distance from one another is approximately the same as the axial extend (length) of the winding reel 15. On movement of winding reel 15 from its rest or operation position into the locking setting the reel 15 is hence perfectly supported over its entire axial length by frame pieces 22, 23 so there is attained an exact synchronous movement of the two end plates 38 and 29 which carry teeth 20 and 21, The operation of the shown example of embodiment for the automatic rewinding type safety belt retractor will now be explained in greater detail in the following.

In the rest setting, or the normal operating setting shown the winding reel 15 with its two end discs 38 and 39 is positioned in the middle of the apertures 34 and 35 of the two frame pieces 22 and 23. The support for the winding shaft on the side near the spring 17 is obtained through the bridge acting as rocking lever 31 for the bearing needle 14 and through the free limb 26, which is inserted in the bearing location 27. At the other end support of the reel is effected by the bearing peg 45 which is an integral part of the multifunction part 13 and is inserted into the bearing location 28 in the frame piece 23 and through a multifunction part 13 and the bearing location 32 carrying end of the bearing needle 14.

The winding shaft 15 is held resiliently in this setting with the spring force being provided by a spring tab 46 forming a return or restoring spring tab at 46 moulded onto the multifunction part 13 and which spring 46 supports the multifunction part and thereby the bearing pin 14 resiliently relative the frame 1, The spring tab 46 can either be reacted directly on frame 1 or on the mechanism base plate 3 in a sense to tend to keep teeth 20, 21 clear of teeth 36, 37.

The inertia sensor system made up of parts 5 to 11 comprises the vehicle deceleration sensitive sensor (5, 6, 7) mechanism and a belt movement sensitive mechanism 9, 10, 11 which can be actuated separately and independently from one another.

When a vehicle is excessively accelerated or braked the vehicle sensitive mechanism 5, 6, 7 will react and a ratchet 6 of this sensor mechanism will engage a tooth 30 of the ratchet wheel or disc 8 which is fixed relative to the reel 15. This will result in the locking of the winding reel 15 in unwinding direction due to pull on the belt in unwinding direction and will not allow the belt to be unwound further. The winding reel 15 is brought, by rocking 13 and 31 around the swivel axis 25, from the rest setting to its locked setting in which the teeth 20 and 21 on the two end discs 38 and 39 of the winding shaft 15 engage teeth 36 and 37 in the two frame pieces 22 and 23. The entire pull acting on the belt is then reacted by the frame 1, By reason of the feature that the ratchet disc or wheel 8 is rotationally connected to the journal on the side of the winding reel 15 near the mechanism, the sensor reaction generated by the vehicle sensitive sensor system 5, 6, 7 resulting from the engagement of the detent or catch 6 into a tooth 30 of the ratchet disc or wheel 8 is directly utilised for initiating the rocking movement of the winding reel 15 into the locking setting.

When the belt is pulled from the winding reel 15 with excessive acceleration, due to the inertial of the inertia plate 9 there is relative motion between the ratchet wheel 8 and the inertia disc 9 against the force of leaf spring 11. When the spring force threshold leaf spring 11 is overcome the ratchet pawl 10 swivels from its rest setting in FIG. 1 into a locking setting in which the pawl 10 engages in the teeth 29 provided on the multifunction part 13. In the event of continued pulling exerted on the winding reel 15 through the belt this too prevents further turning of the winding reel 15 and at the same time the rocking of the winding reel 15 from the rest setting into the locked setting is initiated. In this case also winding reel 15 swivels around the swivel axle 25. The pulling force introduced through the belt is again fully taken up by the frame 1.

The asymmetrical or out-of centre support of the winding reel 15 in the bearing locations 27 and 28 of the frame pieces 22 and 23 causes a synchronous guiding engagement of the teeth 20 and 21 on the two end discs 38 and 39 of the winding reel 15 into the teeth 36 and 37 respectively in the frame pieces 22 and 23.

By reason of the restoring effect of the spring tab 46, of the multifunction part 13 it is possible for the winding reel 15 to be returned to its starting position. The same applies to the ratchet pawl 10 of the belt sensitive sensor mechanism by virtue of its leaf spring which exercises a restoring effect so that ratchet disc or wheel 8 and the inertia wheel 9 return to rest settings relative to one another. The engagement of the vehicle sensitive sensor mechanisms 5 to 7 with the ratchet wheel 8 is thus also released during the restoring or return movement, Due to the very light construction of the parts of the multifunction mechanism there is an inevitable tendency for small vibrations to occur whilst the mechanism is idle. Such vibration can be due to road vibration transmitted via the wheels and suspension of the vehicle to the vehicle body. In particular it has been found that vibration of the inertia member 7 and its associated parts can vibrate and cause some unacceptable noise in the passenger compartment of a motor car.

Referring to the enlarged view of FIG. 3, the vehicle deceleration sensor mechanism comprises the mentioned plastic moulded frame 5 with an upstanding pillar such as 5a and 5b by which the shaped plastic moulded pawl 6 is pivotally located at 6a, with an elastomeric bush 6b. The pawl rests on a steel sphere 7 which is located by gravity over a small aperture 17 in the lowest point of an inverted obtuse angled conical recess 8. A corresponding and complimentary downward facing conical recess 9 is provided on the underside of the pawl 6. The sphere 7 is therefore loosely located between the mentioned conical recesses 8 and 9 and more than a predetermined deceleration results in lateral outward movement away from its lowest equilibrium position to cause lifting of the pawl 6. Since the sphere 7 is necessarily of high density but quite loosely located and the pivots at 6a, 6b of the pawl are rotationally freely located, the mechanism is prone to movement of ball 7 on its seat due to engine vibration or road wheel vibration transmitted through the vehicle chassis. Such vibration can cause undesirably audible movement and by virtue of the invention the frame 5 and in the present example also the pawl 6 are constructed of composites of materials chosen to ensure that the audibility of vibrational movements is maintained below a predetermined noise level, typically 0.45 Db. Thus the main parts of 5 and 6 are moulded of Acetal whereas the peripheries 10 and 11 of the conical recesses 8 and 9 are formed by integrally moulded annular portions 12 and 13 of an elastomer which extend through the parts as shown at spaced locations such as 10a and 10b respectively as shown. Additionally, the tip of the pawl 6 is coated at 16 with elastomer in the region of contact with the ratchet wheel.

In an alternative embodiment the inertial member, namely the sphere 7 which may be lead or steel, may be provided with an elastomer coating as indicated at 7a in FIG. 4. In this alternative, the annular elastomer portions 10 and 11 are omitted but the elastomer tip 16 of pawl 6 and the elastomer bushing 6b is retained.

Referring now to FIG. 5, the pawl 6 is differently formed as compared with the other embodiments of the vehicle deceleration sensor mechanism, in so far as 6 is now provided with a distinct elastomeric portion 6c which rests upon the steel sphere. The portion 6c is integral with 6 only at the region of attachment near the pivot 6a. In this example the steel sphere 7 is located over an aperture 17 of the acetal frame 5 but the pivot 6a is carried in an elastomeric bushing.

In the further alternative version shown in FIG. 6, the sphere 7 rests over aperture 17 of the acetal base 5 but the upper surface is now formed with an integral elastomer seating 10a. Similarly to the embodiment of FIG. 3, the pawl 6 is provided not only with an elastomer tip 16 and bushing 6b but also an integral elastomer peripheral part 11. In addition the pawl is provided with an elastomeric cap element 11a which stands proud of the lower surface of pawl 6 and provides the upper engagement with steel sphere 7.

Figure 7:
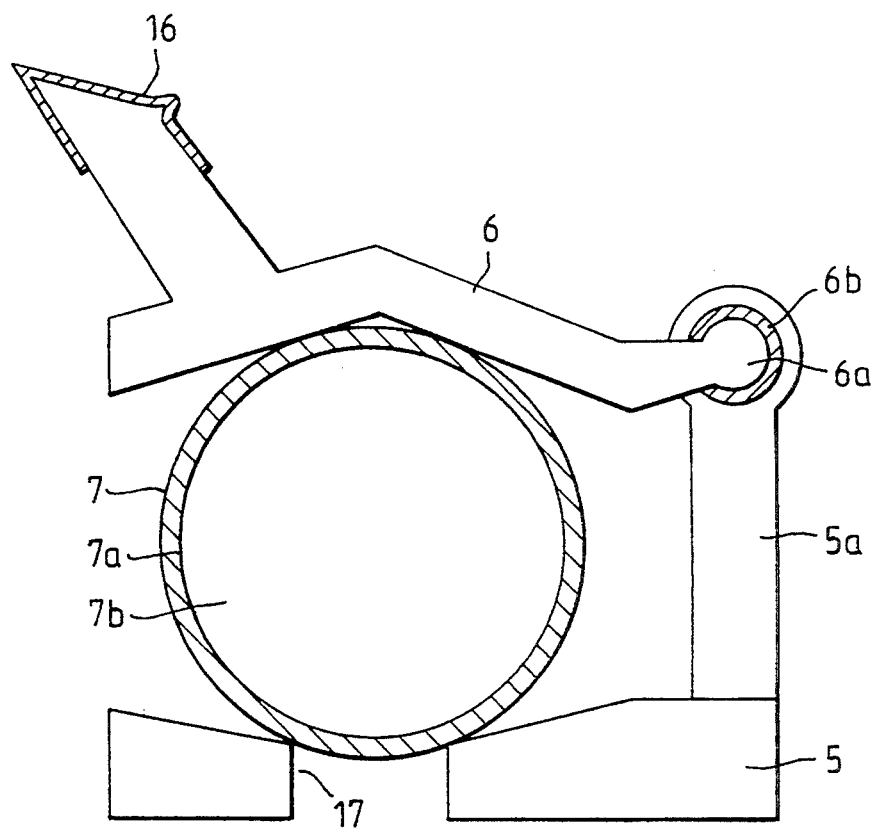

In yet another alternative of FIG. 7 the pawl 6 is provided with elastomer bushing 6 and tip 16 as in previous embodiments but beyond this the sphere 7 is formed as an elastomer exterior 7a with internal metallic preferably steel or lead ballast 7b to provide the desired inertial mass. The acetal pawl 6 rests directly upon the elastomer sphere which in turn is located over the aperture 17 of the acetel base.

From the foregoing it will be appreciated that depending upon the particular application and the geometry of the inertial sensing mechanism, only selected ones of the various components may need to be constructed of combinations of rheologically or acoustically different materials.

Although vibrational movement is not entirely prevented in view of the fact that the elastomer employed in the mechanisms of FIGS. 3 to 7 is rheologically appreciably softer than the acetel, noise due to component rattle is substantially less audible than it otherwise would be.

We claim:

1. A vehicle passenger seat belt emergency locking mechanism comprising a frame normally permitting free movement of belt material and an inertial sensing mechanism comprising one or more moulded parts cooperable with locking means to cause the belt material to be locked against withdrawal from the frame by the effect of belt tension at least one or more of said moulded parts comprises at least two acoustically different materials, said inertial sensing mechanism including a base part carried by said frame, a movable inertial part normally supported by said base part, in a predetermined position, and a pivotally supported member of a first material which rests against said inertial part to be deflectable thereby on movement of the inertial part said pivotally supported member supported by a pivot of a second acoustically different material.

2. A vehicle passenger seat belt emergency locking mechanism as claimed in claim 1 said second material comprising an elastomer.

3. A vehicle passenger seat belt emergency locking mechanism comprising a frame normally permitting free movement of belt material and an inertial sensing mechanism comprising one or more moulded parts cooperable with locking means to cause the belt material to be locked against withdrawal from the frame by the effect of belt tension, said inertial sensing mechanism including a base part supported relative to said frame, a movable inertial part normally supported by said base part, in a predetermined position, and a pivotally supported member of a first material which rests against said inertial part to be deflectable thereby on movement of the inertial part, said inertial part having an external region of a second acoustically different material engageable with said base part and said pivotally supported member.

4. A vehicle passenger seat belt emergency locking mechanism as claimed in claim 3 said second material comprising an elastomer.

5. A vehicle passenger seat belt emergency locking mechanism comprising a frame normally permitting free movement of belt material and in inertial sensing mechanism comprising one or more moulded parts cooperable with locking means to cause the belt material to be locked against withdrawal from the frame by the effect of belt tension, said inertial sensing mechanism including a base part supported relative to said frame, a movable inertial part normally supported by said base part, in a predetermined position, and a pivotally supported member of a first material having a tip portion, wherein said tip portion is covered by a second acoustically different material engageable with a cooperating part to prevent withdrawal of the belt.

6. The device as defined in claim 5 wherein said second material comprises an elastomer.

\* \* \* \* \*